(12) United States Patent
Won et al.

(10) Patent No.: US 11,794,566 B2
(45) Date of Patent: Oct. 24, 2023

(54) SYSTEM AND METHOD FOR EMPLOYING GASOLINE COMPRESSION IGNITION IN A HYBRID ELECTRIC VEHICLE

(71) Applicant: Saudi Arabian Oil Company, Dhahran (SA)

(72) Inventors: Hyun Woo Won, Rueil-Malmaison (FR); Junseok Chang, Dhahran (SA); Kukwon Cho, Novi, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 386 days.

(21) Appl. No.: 16/249,237

(22) Filed: Jan. 16, 2019

(65) Prior Publication Data
US 2020/0223424 A1 Jul. 16, 2020

(51) Int. Cl.
*B60K 6/48* (2007.10)
*B60W 20/13* (2016.01)
(Continued)

(52) U.S. Cl.
CPC ............ *B60K 6/48* (2013.01); *B60K 6/26* (2013.01); *B60K 6/44* (2013.01); *B60W 10/06* (2013.01); *B60W 10/08* (2013.01); *B60W 10/26* (2013.01); *B60W 20/10* (2013.01); *B60W 20/13* (2016.01); *B60W 20/19* (2016.01); *B60W 20/40* (2013.01); *B60K 2006/268* (2013.01); *B60W 2510/244* (2013.01); *B60W 2520/10* (2013.01); *B60W 2540/10* (2013.01); *B60W 2710/0666* (2013.01);
(Continued)

(58) Field of Classification Search
CPC .... B60K 2006/4825; B60K 6/48; B60K 6/26; B60K 6/44; B60W 20/19; B60W 20/13; B60W 10/06; B60W 10/08; B60W 10/26; B60W 20/10; B60W 2540/10; B60W 2710/0666; B60W 2710/067; B60W 2710/086; B60Y 2200/92
USPC ............................................ 701/101, 81, 22
See application file for complete search history.

(56) References Cited

U.S. PATENT DOCUMENTS

| 7,104,349 B2 | 9/2006 | Gray, Jr. et al. |
| 7,748,481 B2 | 7/2010 | Holmes et al. |

(Continued)

FOREIGN PATENT DOCUMENTS

| CN | 106499538 A | 3/2017 |
| EP | 3299608 A2 | 3/2018 |

OTHER PUBLICATIONS

Jinlong Hong, et al., "Architecture Optimization of Hybrid Electric Vehicles with Future High-Efficiency Engine", Energies 11, 1148 (2018).

(Continued)

*Primary Examiner* — Jacob S. Scott
*Assistant Examiner* — Michael E Butler
(74) *Attorney, Agent, or Firm* — Leason Ellis LLP (57) ABSTRACT

A hybrid electric vehicle comprises a set of wheels, a mechanical transmission adapted to provide torque to the set of wheels, an electric motor coupled to and providing motive force to the mechanical transmission, battery storage coupled to and supplying electrical power to the electric motor, and a gasoline compression ignition (GCI) engine coupled to at least one of the mechanical transmission and the electric motor so as to provide mechanical energy to the mechanical transmission and energy for operating the electric motor.

5 Claims, 6 Drawing Sheets

(51) Int. Cl.
*B60W 20/19* (2016.01)
*B60K 6/26* (2007.10)
*B60K 6/44* (2007.10)
*B60W 10/06* (2006.01)
*B60W 10/08* (2006.01)
*B60W 10/26* (2006.01)
*B60W 20/40* (2016.01)
*B60W 20/10* (2016.01)

(52) U.S. Cl.
CPC .............. *B60W 2710/0677* (2013.01); *B60W 2710/086* (2013.01); *B60Y 2200/92* (2013.01)

(56) References Cited

U.S. PATENT DOCUMENTS

| | | | |
|---|---|---|---|
| 8,793,043 | B2 | 7/2014 | Kim |
| 10,202,929 | B1* | 2/2019 | Dec ........................ F02D 35/028 |
| 2003/0183431 | A1* | 10/2003 | Cikanek ................... B60K 6/48 180/65.6 |
| 2005/0173169 | A1 | 8/2005 | Gray, Jr. |
| 2007/0204830 | A1* | 9/2007 | Andri ..................... B60K 6/445 123/198 F |
| 2008/0276913 | A1 | 11/2008 | Zubeck |
| 2010/0062896 | A1* | 3/2010 | Falkenstein .............. B60K 6/00 477/3 |
| 2012/0078455 | A1* | 3/2012 | Chrostowski ....... B60W 30/188 701/22 |
| 2012/0312122 | A1* | 12/2012 | Miller ..................... B60K 6/46 74/664 |
| 2013/0104543 | A1* | 5/2013 | Zoldak ................... F02M 26/08 123/568.11 |
| 2014/0244087 | A1* | 8/2014 | Jeong ..................... F04B 35/04 701/22 |
| 2018/0072304 | A1* | 3/2018 | Cyr ......................... B60K 6/00 |
| 2018/0326988 | A1* | 11/2018 | Lechlitner .............. B60K 6/442 |
| 2019/0039599 | A1* | 2/2019 | Hawley .................. B60W 10/06 |
| 2019/0054913 | A1* | 2/2019 | Lad ......................... B60K 6/547 |
| 2019/0176801 | A1* | 6/2019 | Ruybal ............... B60L 15/2054 |
| 2019/0232941 | A1* | 8/2019 | Wang .................... B60W 50/08 |

OTHER PUBLICATIONS

International Search Report and Written Opinion in Corresponding PCT Application No. PCT/US2020/013873 dated May 6, 2020. 17 pages.
International Preliminary Report on Patentability in Corresponding PCT Application No. PCT/US2020/013873 dated Mar. 25, 2021. 27 pages.
Written Opinion of the International Preliminary Examining Authority in corresponding PCT Application No. PCT/US2020/013873 dated Dec. 16, 2020. 6 pages.
Yanuandri Putrasari et al.; A Review of Gasoline Compression Ignition: A Promising Technology Potentially Fueled with Mixtures of Gasoline and Biodiesel to Meet Future Engine Efficiency and Emission Targets; https://www.mdpi.com/1996-1073/12/2/238; Energies 2019, 12, 238; 27 pages.
Kalghatgi, G.T.; et al.; Advantages of Fuels with High Resistance to Auto-Ignition in Late-Injection, Low-Temperature, Compression Ignition Combustion; SAE Technical Paper 2006-01-3385;SAE International: Warrendale, PA, USA, 2006; 13 pages.
Won, H.W.; et al.; Partially Premixed Combustion of Gasoline Type Fuels Using Larger Size Nozzle and Higher Compression Ratio in a Diesel Engine; SAE Technical Paper, SAE International: Warrendale, PA, USA, 2013; vol. 11.; 18 pages.
Van Thanh Ngo, et al.: Comparison of the combustion characteristics of gasoline and gasoline-ethanol blend under gasoline compression ignition mode; Cogent Engineering, vol. 9 (2022).; 16 pages.
Kalghatgi, G.T.; the outlook for fuels for internal combustion engines; International Journal of Engine Research, vol. 15, Issue 4 (2014); 49 pages.

* cited by examiner

SYSTEM AND METHOD FOR EMPLOYING GASOLINE COMPRESSION IGNITION IN A HYBRID ELECTRIC VEHICLE

FIELD OF THE INVENTION

The present invention relates to automotive technology, and, more particularly, relates to a method and system for employing gasoline compression ignition (GCI) in a hybrid electric vehicle (HEV).

BACKGROUND OF THE INVENTION

As a result of stringent vehicle emission regulations around the world, such as carbon dioxide ($CO_2$) emission limits, many automobile manufacturers of light duty vehicles are considering switching their production efforts toward electrical or hybrid electric vehicles (HEV), since vehicles produce minimal emissions while running on an electric motor. Current hybrid electric vehicle technologies combine an electric motor/battery with either a conventional gasoline spark ignition (SI) engine or a diesel compression ignition (CI) engine. In comparison to regular completely fuel-driven vehicles of similar type, hybrid vehicles consumer up to 30 percent less fuel consumption in urban settings. However, this increase in fuel efficiency is not accompanied by a sufficient reduction in emissions.

Emissions can be reduced further by eliminating the engine and relying fully on electrical power. This solution is hampered by the fact that current lithium-based battery storage is not adequate for long journeys, and the lack of charging infrastructure in many locations.

What is therefore needed is an engine technology that can be used in a hybrid electric vehicle that is has a reduced emissions profile in comparison with conventional SI and diesel engines, capable of compliance with the most stringent emission regulations.

SUMMARY OF THE INVENTION

Embodiments of the present invention provide a hybrid electric vehicle that comprises a set of wheels, a mechanical transmission adapted to provide torque to the set of wheels, an electric motor coupled to and providing motive force to the mechanical transmission, battery storage coupled to and supplying electrical power to the electric motor, a gasoline compression ignition (GCI) engine coupled to at least one of the mechanical transmission and the electric motor so as to provide mechanical energy to the mechanical transmission and energy for operating the electric motor, and an electronic control unit coupled to and adapted to control operation of the GCI engine and the electric motor.

In certain embodiments, the hybrid electric vehicle further comprises a fuel supply coupled to the GCI engine containing high octane gasoline fuel and the GCI engine is coupled to both the mechanical transmission and the electric motor and the electronic control unit is adapted to control the GCI engine to provide motive power for the vehicle alone at medium and high loads. In certain implementations, he electronic control unit operates the electric motor to start the vehicle and to provide motive power for the vehicle alone at low loads. The electronic control unit can also control the electric motor to function in generator mode when a charge on the battery storage falls below a threshold value.

In certain additional embodiments, the hybrid electric vehicle further comprises a fuel supply coupled to the GCI engine containing medium octane gasoline fuel, and an electric generator mechanically coupled to and powered by the GCI engine. The GCI engine and the electric motor are both coupled to both the mechanical transmission to provide motive power for the vehicle either simultaneously together or individually. In certain implementations, the electronic control unit is adapted to control the GCI engine to provide motive power for the vehicle alone at medium loads cruising and medium to high load transitions. The electronic control unit can also operate the electric motor to start the vehicle and to provide motive power for the vehicle alone at low loads and can operate both the GCI engine and electric motor to provide motive power simultaneously to boost acceleration and under high loads.

In certain additional embodiments, the hybrid electric vehicle further comprises a fuel supply coupled to the GCI engine containing low octane gasoline fuel, and a power-split device mechanically coupled to the GCI engine and to the electric motor, and an electric generator coupled to the power-split device. The electronic control unit controls the amount of motive power provided by both the GCI engine and the electric motor to drive the vehicle. In certain implementations, the electronic control unit is adapted to control the GCI engine to provide motive power for the vehicle alone at medium loads cruising and medium to high load transitions. The electronic control unit can also operate both the GCI engine and electric motor in parallel to provide motive power simultaneously to boost acceleration and under high loads, and to direct energy from GCI engine to charge the battery storage via the electric generator when a charge of the battery storage falls below a threshold value. The electronic control unit also operates the electric motor to start the vehicle and to provide motive power for the vehicle alone at low loads.

In certain further embodiment, the hybrid electric vehicle further comprises a fuel supply coupled to the GCI engine containing gasoline fuel, and an electric generator mechanically coupled to and powered by the GCI engine. The electric motor is coupled to the mechanical transmission to provide motive power for the vehicle and the electronic control unit is adapted to control the electric generator to provide power to the electric motor. In certain implementations, the hybrid electric vehicle further comprises a rectifier coupled to an output of the electric generator and coupled to an input of the electric motor to supply a rectified electric signal to the electric motor. The electronic control unit can be adapted to determine a magnitude of requested power and to operate the electric motor from battery storage is the amount of request power is less than the amount of power provided by the battery storage. The electronic control unit can be adapted to determine a magnitude of requested power and to operate the electric motor from the electric generator if the amount of power requested exceeds the amount of power provided by the battery storage and is less than the amount of power provided by the electric generator, and any excess power is used to charge the battery storage. In addition, the electronic control unit can be adapted to determine a magnitude of requested power and to operate the electric motor from both battery storage and the electric generator if the amount of power requested exceeds the amount of power provided by the electric generator, and any excess power is used to charge the battery storage. The electronic control unit can further be adapted to determine a magnitude of charge in the battery storage, and to control the electric generator to recharge the battery storage if the determined magnitude of charge falls below a threshold.

Embodiments of the present invention also provide a method of operating a hybrid electric vehicle containing an internal combustion engine and an electric motor. The method comprises supplying the vehicle with gasoline fuel supplying the vehicle with battery storage, operating the internal combustion engine in gasoline compression ignition (GCI) mode to auto-ignite the gasoline fuel, coupling the electric motor to a mechanical transmission to provide motive power to the vehicle, and channeling output of the internal combustion engine to drive at least one of a mechanical transmission and an electric generator.

In certain embodiments, the method further comprises arranging the electric motor and the internal combustion engine to be able to power the vehicle in parallel.

Additionally or alternatively, the method can further comprise providing an electric generator coupled to the internal combustion engine, the internal combustion engine powering the generator to be able to recharge the battery storage and provide additional power to the electric motor.

In certain embodiments, the method further comprises arranging the internal combustion engine, an electric generator and the electric motor in series.

In certain alternative embodiments, the method further comprises coupling the internal combustion and the electric motor to a power-split device.

These and other aspects, features, and advantages can be appreciated from the following description of certain embodiments of the invention and the accompanying drawing figures and claims.

DETAILED DESCRIPTION CERTAIN OF EMBODIMENTS OF THE INVENTION

Disclosed herein are hybrid electric vehicles that combine an electric motor with an internal combustion engine that is adapted to auto-ignite standard unleaded gasoline via compression ignition (referred hereinafter to as the GCI engine). The GCI engine is operated at conditions where the benefits of GCI engine can be maximized, while the electric motor can be operated instead of, or as a supplement to the GCI engine, under conditions in which operation of the GCI engine alone is less optimal. The GCI hybrid powertrain can achieve fuel efficiencies higher than state-of-the-art diesel hybrid powertrains, at lower cost, with a significantly improved emissions profile because GCI engines can reduce both nitrogen oxides (NOx) and particulate matter (PM) emissions significantly by operating under diluted and partially-premixed conditions.

Gasoline Compression Ignition

Compared to diesel fuel, gasoline has a longer ignition delay. This allows gasoline to be injected late in the compression stroke at high fuel pressure (100 to 500 bar) and high temperature to obtain a mixed and stratified fuel/air charge (i.e., a fuel/air mixture with local regions of higher and lower rations of fuel to air).

In the GCI process, fuel is injected into a centrally-mounted piston bowl at high pressure late in the compression stroke and no fuel is injected during the air intake stroke. The fuel and air mixture auto-ignites in a controlled heat release process. Due to the late injection, little end gas remains to induce engine knocking. In addition, by recirculating cooled exhaust gas recirculation (EGR), the fuel/air mixture is diluted, which increases the ignition delay period and lowers the combustion temperature. Due to the lowered temperatures NOx and emission products are reduced, as well as heat transfer losses.

More specifically, to achieve these outstanding results, precise electronic control of the fuel injection process is provided. Fuel is injected in several distinct injection events to produce controlled air-fuel mixture stratification in the combustion chamber. The stratification of the fuel in the combustion chamber governs the timing at which autoignition occurs and the rate at which it proceeds. Depending on engine speed and load, single-injection, double-injection, and various other multiple injection strategies with varying fuel quantities may be used. By setting the start of injection timing and the amount of fuel injected per injection event, and thereby the mixture stratification, detrimental combustion of air-fuel mixtures beyond the boundary of the controlled combustion flame front can be eliminated, preventing engine knocking. Moreover, to achieve low $NO_x$ and PM emissions with minimum fuel consumption, the injection timing and quantity can be variably controlled over a range of speed-load-temperature map in concert with other engine operating parameters. In general, in GCI processes, fuel is sufficiently mixed prior to attaining autoignition temperature so that the combustion process is controlled by the fuel reactivity rather than diffusion or mixing. Precise control of the combustion temperature and fuel/air ration enables auto-ignition at low enough temperatures to avoid $NO_x$ formation and a lean enough mixture to avoid PM emissions, both which are challenging to avoid with combustion parameters depends on the diffusion of the mixture. In sum, GCI operation relies upon electronic control of ignition events based on current engine conditions to optimize efficiency and emissions.

Figure 1:
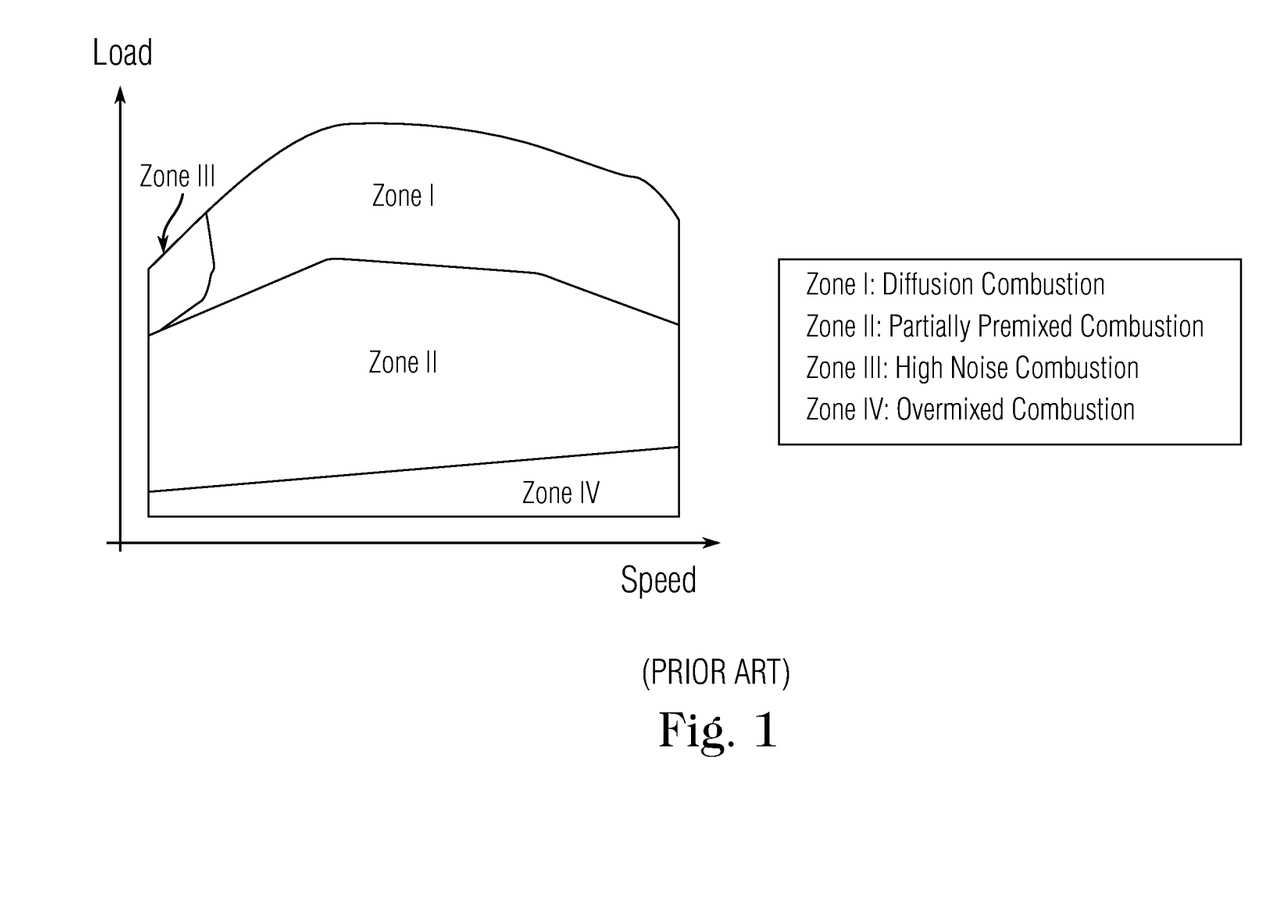
FIG. 1 is a load/speed graph showing the zones of operation of a GCI engine.

The GCI engine operation strategy map can be typically classified into four different zones on a load/speed graph, shown in FIG. 1. Zone I, which covers high loads and speeds, is referred to as a diffusion combustion zone. Combustion occurring in the diffusion combustion zone is similar to conventional diesel CI combustion which comprises a short, premixed combustion phase and a longer diffusion-controlled combustion phase. In the diffusion combustion zone, GCI operation has little advantages over conventional diesel CI engines benefits in terms of emissions and efficiency.

The second zone of FIG. 1, Zone II, is referred to as a partially premixed combustion zone. In this zone, which covers all engine speeds at medium engine loads, the benefits of GCI operation can be obtained to reduce emissions while maintaining high efficiency. The size of this zone in FIG. 1 exemplary, and the upper limit of Zone II can be increased using low reactivity (high RON) fuels and the lower limit can be decreased using low reactivity fuels.

The third zone of FIG. 1, Zone III, can be referred to as a high noise combustion zone. In this zone, at which engine speed is low, while engine load is medium to high, the GCI combustion front tends to become diluted, with elevated risk of engine knocking (noise). Managing the noise at low speeds is more challenging than at high speed. Additionally, due to lower turbulence levels at lower engine speeds, the ability to reduce injection pressure to mitigate the combustion noise is hampered by its effect on particulate emissions.

Zone IV, which can be referred to as overmixed combustion, covers low load conditions. To meet such conditions, GCI operation and timing events result in an over-mixing of fuel and air. The overmixing causes HC and CO emissions tend to be higher than in conventional diesel combustion due to the formation of localized pockets of highly lean mixture that cannot burn entirely.

With the above-described properties of GCI engines in view, hybrid electric configuration that employ GCI operation will now be described.

Parallel GCI/Electric Hybrid

Different parallel or power-split hybrid configurations can be employed different fuels to maximize ICE performance at minimum costs. The different configurations can be selected depending on the specific GCI engine and according to the qualities of the different auto-ignition qualities of the gasoline fuels used in the GCI engine.

Figure 2:
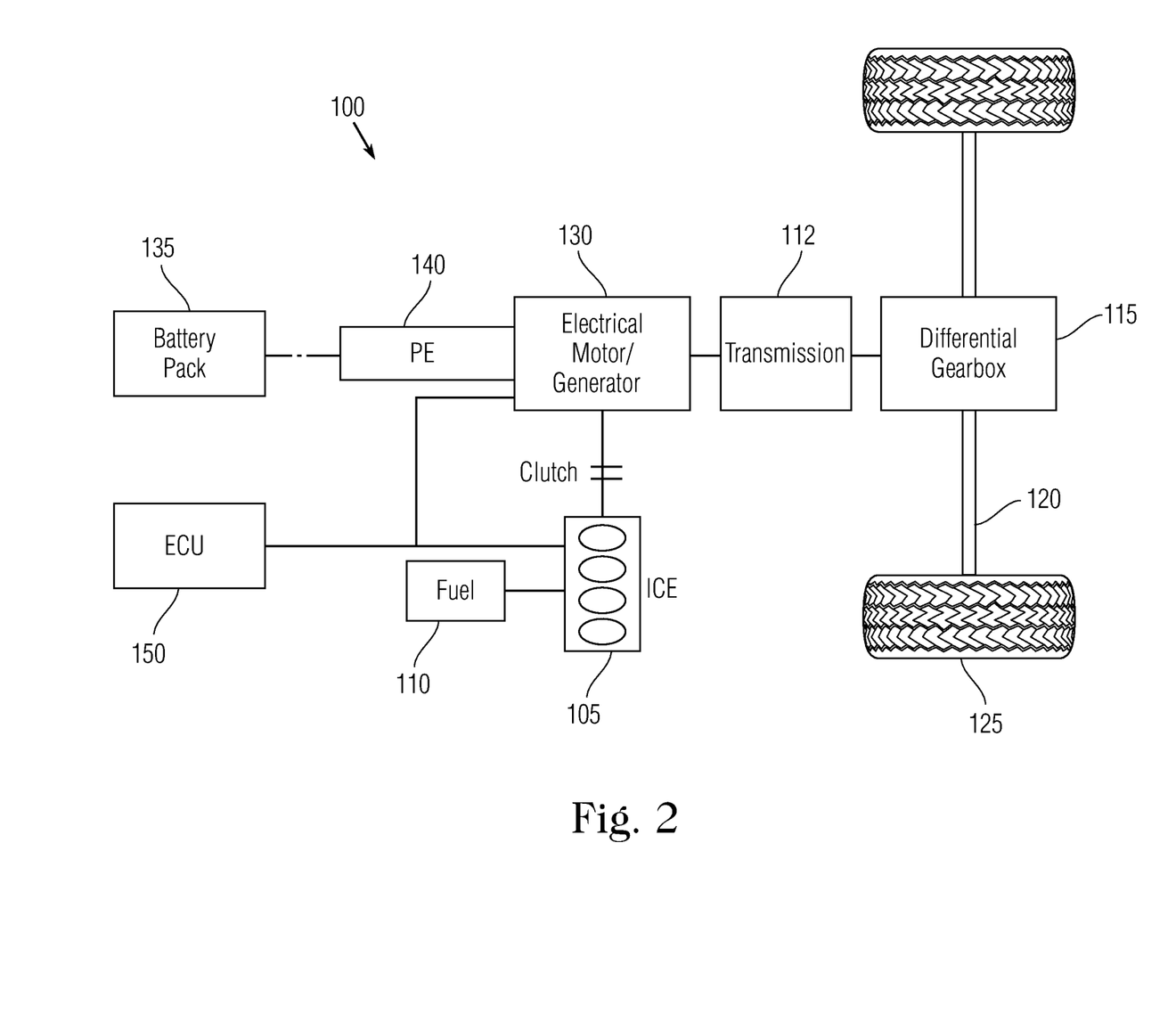
FIG. 2 is a schematic diagram of a "basic" parallel HEV configuration employing a GCI engine according to an embodiment of the present invention.

FIG. 2 is a schematic diagram of a "basic" parallel hybrid vehicle 100 employing a GCI engine according to an embodiment present invention. The vehicle 100 comprises a first path for providing motive power that includes an GCI engine (ICE) 105 that is coupled to a fuel supply 110 for receiving fuel and to a differential gear box 115. Combustion in the GCI pistons drives a transmission 112 coupled to the gears of gear box 115. The gears within gear box 115 are coupled to a wheel axle 120, to which a set of vehicle wheels 125 is attached. The vehicle 100 also comprises a second path for providing motive power that includes an electric motor 130 that can also act as an electric generator. The electric motor 130 is coupled to battery storage 135 via a power electronics module 140 that is adapted to modulate the amount of electrical energy delivered to the motor by the battery storage 135. The electric motor is coupled to both the GCI engine 105 and, via another path, directly to the differential gear box 115 (both couplings can be through intermediary clutches as shown).

An electronic control unit (ECU) 150, which can comprise one or more processors and application-specific circuits, is communicatively coupled to the GCI engine 105 and the electronic motor 130 to send control signals for governing the operation of both the engine and the motor. The ECU 150 also receives signals from one or more sensor elements (not shown) that provide information as to current conditions including, for example, engine load, engine speed, fuel mixture, pressure and temperature. FIGS. 6A-6D are schematic load/speed graph illustrating optimal conditions for utilizing the GCI engine (internal combustion) in the hybrid engine embodiments depicted in FIGS. 2, 3, 4, and 5 described herein. In the various embodiments, the ECU 150 is configured to be able to determine from current load/speed conditions whether the GI engine it to be activated and/or coupled to the transmission to provide motor power. In some implementations, the ECU can include a lookup table with such conditions, with values adapted for the particular hybrid vehicle embodiment. For example, in the schematic load/speed of FIG. 6A, "X" marks represent combinations of load and speed at which the GCI engine is to be operated in the hybrid vehicle embodiment of FIG. 2. A lookup table can be implemented to indicate the "X" values and a control algorithm can be implemented to obtain current vehicle load and speed values and to compare the current values with the lookup table. Alternatively, instead of a lookup table, a control algorithm can employ dynamic equations that can determine the "X" values in real time based on a dynamic model that incorporates fuel parameters. Incorporation of a dynamic model can be more suitable in certain embodiments in which static look-up values require modification, for example, when the octane rating of the fuel approaches a borderline between high and medium, or the like. In all embodiments, the ECU is configured using data and instructions suited to the vehicle embodiment and to the corresponding fuel type for which the vehicle embodiment is particularly adapted.

Figure 6A:
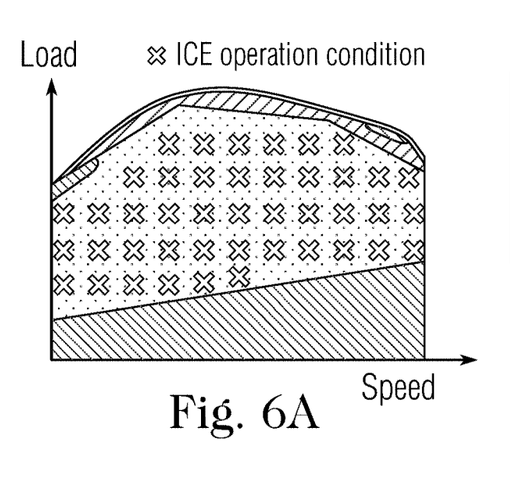
FIG. 6A is a schematic load/speed graph illustrating optimal conditions for utilizing the GCI engine (internal combustion) in the basic parallel HEV configuration shown in FIG. 2.

The parallel HEV configuration of FIG. 2 is particularly suited for use with high octane fuels (i.e., with octane number (RON) greater than 85), which are the most prevalently marketed and publicly available gasolines. Under load/speed conditions of Zone II (of FIG. 1), GCI operation with high octane fuels in this configuration significantly reduces $CO_2$, NOx and PM emissions in the GCI combustion mode (green zone). Under other load/speed conditions outside of Zone II, hybridization enables an efficiency improvement by supporting the operation in low efficiency regimes. In other words, the GCI engine 105 can be employed to drive the differential gears at medium to high loads while the electric motor 130 can be employed to drive the gears at lower loads. As noted, FIG. 6A illustrates the areas of the load/speed graph in which the GCI engine is operated using high octane fuels. The ECU 150 is adapted to determine the load/speed condition and to cause a switch between engine and motor operation accordingly.

In some implementations, the hybrid vehicle 100 can be operated with following modes: a) an electric vehicle mode, in which the electric motor 130 can be used to start from rest and/or fully drive the gears of the vehicle under low load conditions; b) an ICE mode in which the GCI engine 105 provides the full motive power at medium and higher loads; c) an ICE with EM generation mode in which the GCI engine provides the motive power for the vehicle when it is detected that the battery storage level has dropped below a selected threshold. In this event, the electric motor 130 can be switched to electrical generation mode and the GCI engine 105 can be used to charge the battery storage 135; and d) a braking mode in which regenerative braking can be fully used for moderate and mechanical braking as suitable.

The electric motor 130 can have lower power specifications, for example a motor having a power range of about 20 kW to about 40 kW can be used, and a supplemental generator is not required. In some implementations, it can be preferable to operate the gear box 115 in a continuously variable transmission (CVT) mode to improve smoothness and drive responsiveness as well as reduce fuel consumption. The voltage capacity of battery storage 130 can also be relatively low, for example in a range of about 0.6 to about 2.0 kilowatt-hours (kWh). The low-power ratings for the motor and battery storage help keep costs down, and the simplicity and cost effectiveness of the hybrid embodiment shown in FIG. 2 is make it highly suitable for GCI engine with the high-octane market gasoline fuel applications.

Full Parallel GCI/Electric Hybrid

Figure 3:
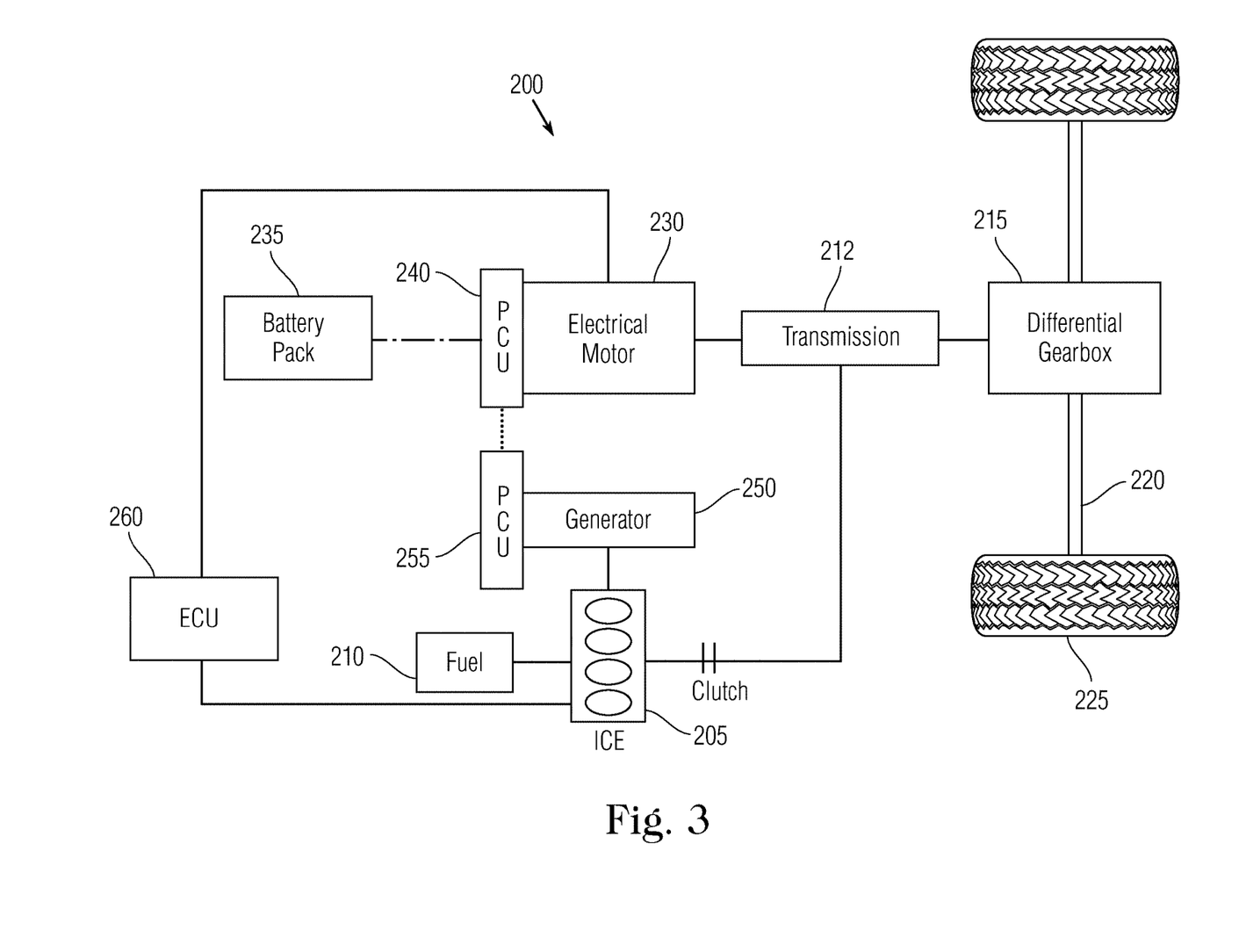
FIG. 3 is a schematic diagram of a full parallel HEV configuration employing a GCI engine according to an embodiment of the present invention.

Referring now to FIG. 3, a schematic diagram of a full parallel hybrid electric vehicle 200 employing a GCI engine according to another embodiment present invention is shown. The vehicle 200 comprises a first path for providing motive power that includes an GCI engine (ICE) 205 that is coupled to a fuel supply 210 for receiving fuel and to a mechanical transmission 212 via a clutch. The mechanical transmission is coupled to a differential gear box 215. The gears within gear box 115 are coupled to a wheel axle 220, to which a set of vehicle wheels 225 is attached. The vehicle 200 also comprises a second path for providing motive power that includes an electric motor 230 that is also coupled to the transmission 212. The electric motor 230 is coupled to battery storage 235 via a first power control unit 240 which is adapted to regulate the voltage and current provided by the battery storage 235 to the electric motor. A separate electric generator 250 is coupled to receive motive power from the GCI engine 205, to generate electrical power. The electrical power supplied by generator is deliver through a second power control unit 255, which is electrically coupled to the first power control unit. Through this arrangement, there is an independent path for providing electrical power to the electric motor, so that if battery storage falls below a threshold, or for other reasons, electrical power can be supplied to the electric motor from the electric generator 250. An electronic control unit (ECU) 260, which can comprise one or more processors and application-specific circuits, is communicatively coupled to the GCI engine 205 and the electronic motor 1230 to send control signals for governing the operation of both the engine and the motor. The ECU 260 also receives signals from one or more sensor elements (not shown) that provide information as to current conditions including, for example, engine load, engine speed, fuel mixture, pressure and temperature.

The full parallel HEV utilizes a more powerful electric motor and a larger battery size as compared with the basic parallel HEV of FIG. 2, for example ranging from about 1.0 kWh to about 5.0 kWh. It is preferable to provide supervisory control with continuously variable transmission (CVT).

Figure 6B:
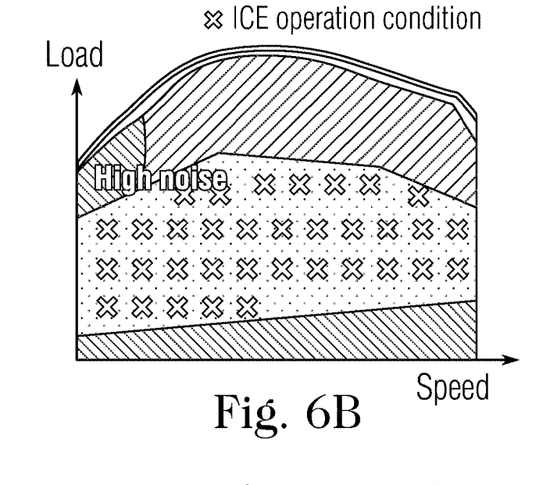
FIG. 6B is a schematic load/speed graph illustrating optimal conditions for utilizing the GCI engine (internal combustion) in the full parallel HEV configuration shown in FIG. 3.
Figure 6C:
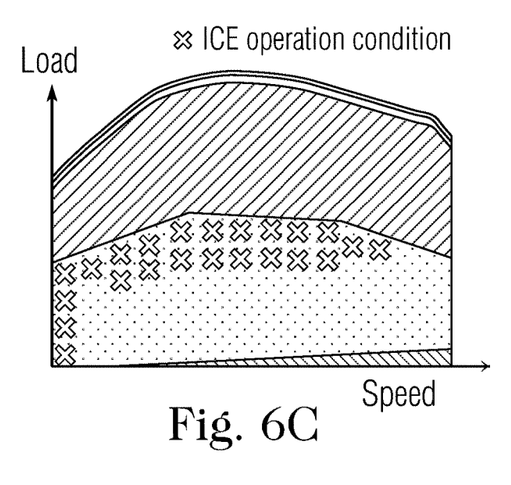
FIG. 6C is a schematic load/speed graph illustrating optimal conditions for utilizing the GCI engine (internal combustion) in the split-power HEV configuration shown in FIG. 4.
Figure 6D:
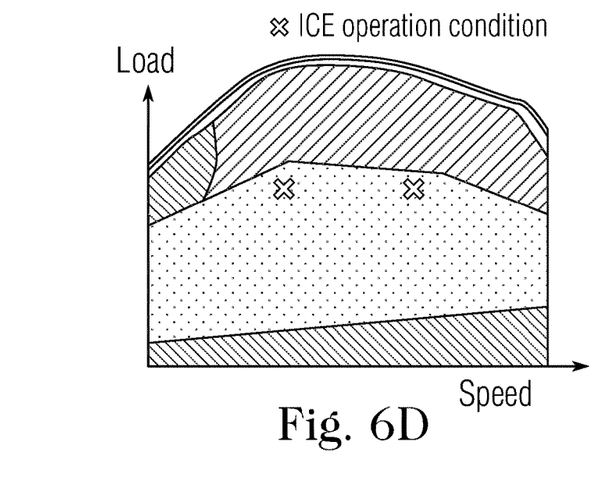
FIG. 6D is a schematic load/speed graph illustrating optimal conditions for utilizing the GCI engine (internal combustion) in the series HEV configuration shown in FIG. 5.

The full parallel HEV configuration of FIG. 3 differs from the configuration of FIG. 2 in that the GCI engine and the electric motor can power the vehicle simultaneously. Again, in comparison to the embodiment of FIG. 2, the embodiment of FIG. 3 is particularly suited for use with medium octane fuels (i.e., with octane number (RON) greater between 60 and 85). With medium octane fuels, the risk of misfire or partial burn at light loads is mitigated significantly, while excessive pressure rise rates are a challenge. FIG. 6B illustrates the areas of the load/speed graph in which the GCI engine is operated using medium octane fuels.

Generally, the torque available to electric motors at starting speed (0 RPM) is at the maximum level the motor can produce. This property of electric motors to provide high levels of instantaneous torque is taken advantage of by commanding additional torque from the electric motor during ramp up of the GC engine to improve start up and acceleration. The full parallel hybrid thereby enables an efficiency improvement in acceleration performance and through support of the GC engine in low efficiency regimes.

In some implementations, the hybrid vehicle 200 can be operated with following modes: a) an electric vehicle mode in which the electric motor 230 can be used during start-up and operation in low load conditions; b) and ICE-only mode used during medium load cruising and medium to high load transitions; c) simultaneous ICE and electric motor mode to provide rapid acceleration. Under very high load conditions the GCI engine 205 supplies additional power through the generator 250 to supplement the power provided by the battery storage 235; d) an ICE+electric motor charging mode in which the both the GCI engine 205 and electric motor 230 provide motive power, but in case that battery storage change falls below a selected threshold, the GCI engine powers the generator 250 to recharge the battery storage 235 via power control units 240, 255; and f) a regenerative braking mode in which regenerative braking can be used completely for moderate braking and mechanical braking, as suitable.

Split-Power GCI/Electric Hybrid

Figure 4:
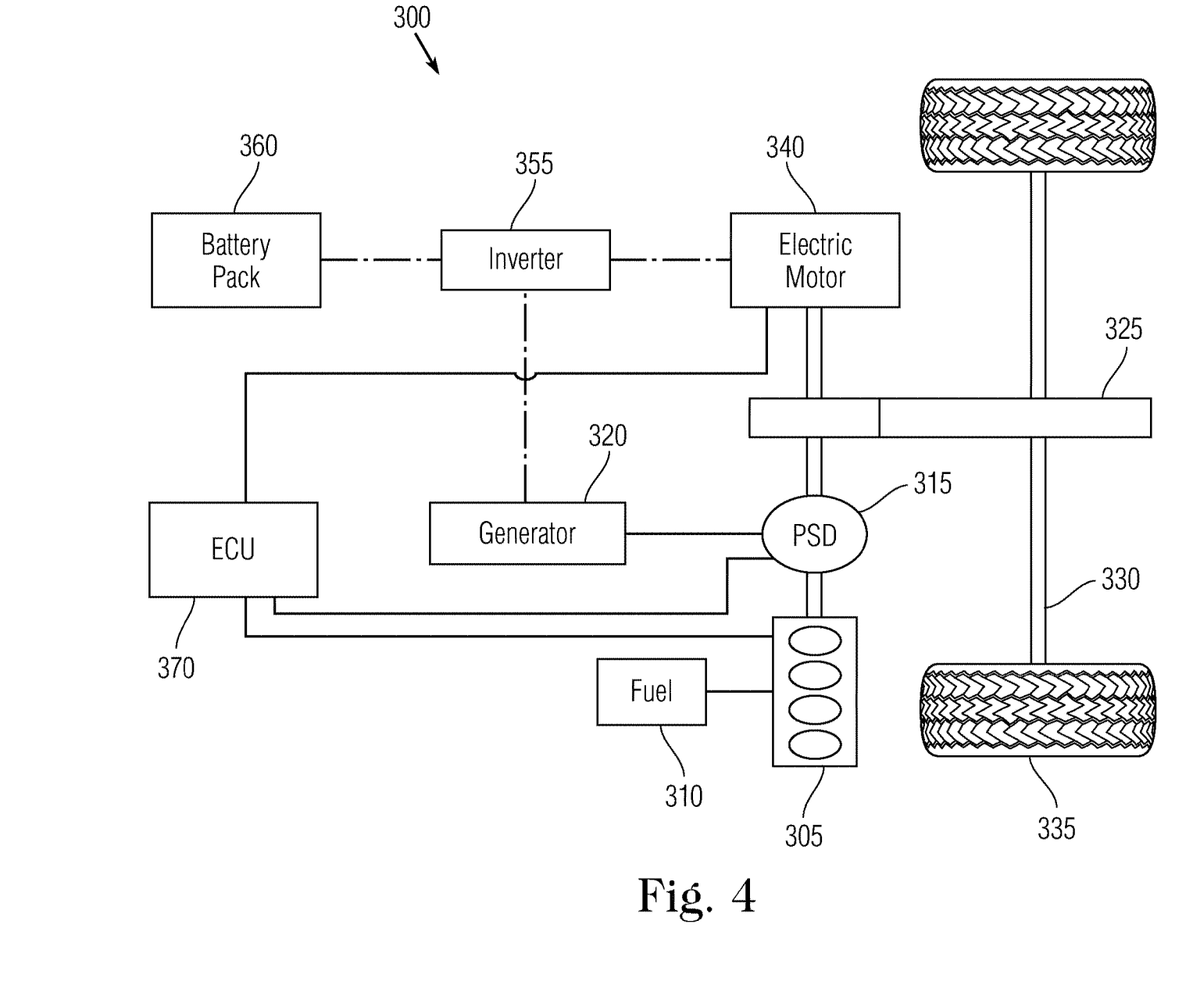
FIG. 4 is a schematic diagram of a split-power HEV configuration employing a GCI engine according to an embodiment present invention.

Referring now to FIG. 4, a schematic diagram of a split-power hybrid electric vehicle 300 employing a GCI engine according to an embodiment present invention is shown. The vehicle 300 comprises a GCI engine 305 that is coupled to a fuel supply 310 for receiving fuel. The GCI is also coupled to a power split device 315 that is adapted to control the split of power between the GCI engine 305 and an electric motor. The power split-device 315 is in turn coupled to a generator 320 and to a mechanical transmission 325. The power split-device 315 provides a continuous variable transmission (CVT) using a planetary gear set which is continually engaged without requiring shifting. In this embodiment, changing the speed of the GCI engine 305 does not necessarily directly affect the speed of the vehicle. The GCI engine can operate at higher or lower speeds depending on how much power is demanded, and with either resistance or assistance from the electric motor the vehicle can attain a desired speed while keeping the GCI engine operating within an optimally efficient range. The mechanical transmission 325 is operatively coupled directly to the wheel axle 330, to which a set of vehicle wheels 335 are attached. There is therefore a direct mechanical path from the GCI engine 305 to the wheels 335 that is not intermediated by a differential gear box. This direct mechanical coupling is very efficient in steady operating conditions such as during cruising.

The power-split device 315 is coupled via the electric generator 320 and to an electric motor 340. The electric generator 320 is also electrically coupled to an inverter 355, which in turns is electrically coupled to battery storage 360 and the electric motor 340. The electric motor 350 is also electromechanically connected to the mechanical transmission 325. An ECU 370 is coupled to the GCI engine 305, electric motor 340 and power-split device 315 and receives signals from one or more sensor elements (not shown) that provide information as to current conditions including, for example, engine load, engine speed, fuel mixture, pressure and temperature.

The split-power HEV configuration of FIG. 4 is particularly adapted for use with low octane gasoline-like fuels (having octane number (RON) between 40 and 60). However, lower octane fuels have low thresholds for autoignition and have similar properties as diesel combustion in the wide diffusion zone shown in FIG. 6C with little benefit over a standard diesel engine. There are benefits to operating the GCI engine in portions the premixed zone (with markings showing optimal conditions for employing the ICE) biased toward higher loads and lower speeds. The power-split configuration is intended to combine certain advantages of the parallel and series configurations (the latter is discussed below with respect to FIG. 5). One of the advantages is that, unlike in the parallel HEV configurations, the GCI engine can be operated independently of the vehicle speed, so that it can be used for charging the batteries or providing motive power at all times. In comparison to the full parallel configuration shown in FIG. 3, the split-power HEV configuration of FIG. 4 can employ a smaller, less powerful driving electric motor as the ICE can directly power the wheels. The additional electric generator and power split device add a certain amount of cost and complexity to the powertrain.

In some implementations, the hybrid vehicle 300 can be operated with following modes: a) an electric mode in which the electric motor 340 is used to start and run the vehicle in low load conditions; b) an ICE-only mode which is activated at medium load cruising and medium to high load transition in which the GCI engine 305 powers the wheels directly; c) an ICE+electric motor mode in which the GCI engine 305 powers the vehicle in parallel with the electric motor quick acceleration is demanded also under very high load conditions; d) and ICE+generation mode in which the GCI engine 305 powers the vehicle and of the battery storage charge drops below a selected threshold, the GCI engine powers the generator 320 to charge the battery storage 360 via the inverter 355. In this mode, the electric motor 340 can also operate as a generator or can provide no power; e) a braking mode in which regenerative braking can be used completely for moderate and mechanical braking.

Series GCI/Electric Hybrid

Figure 5:
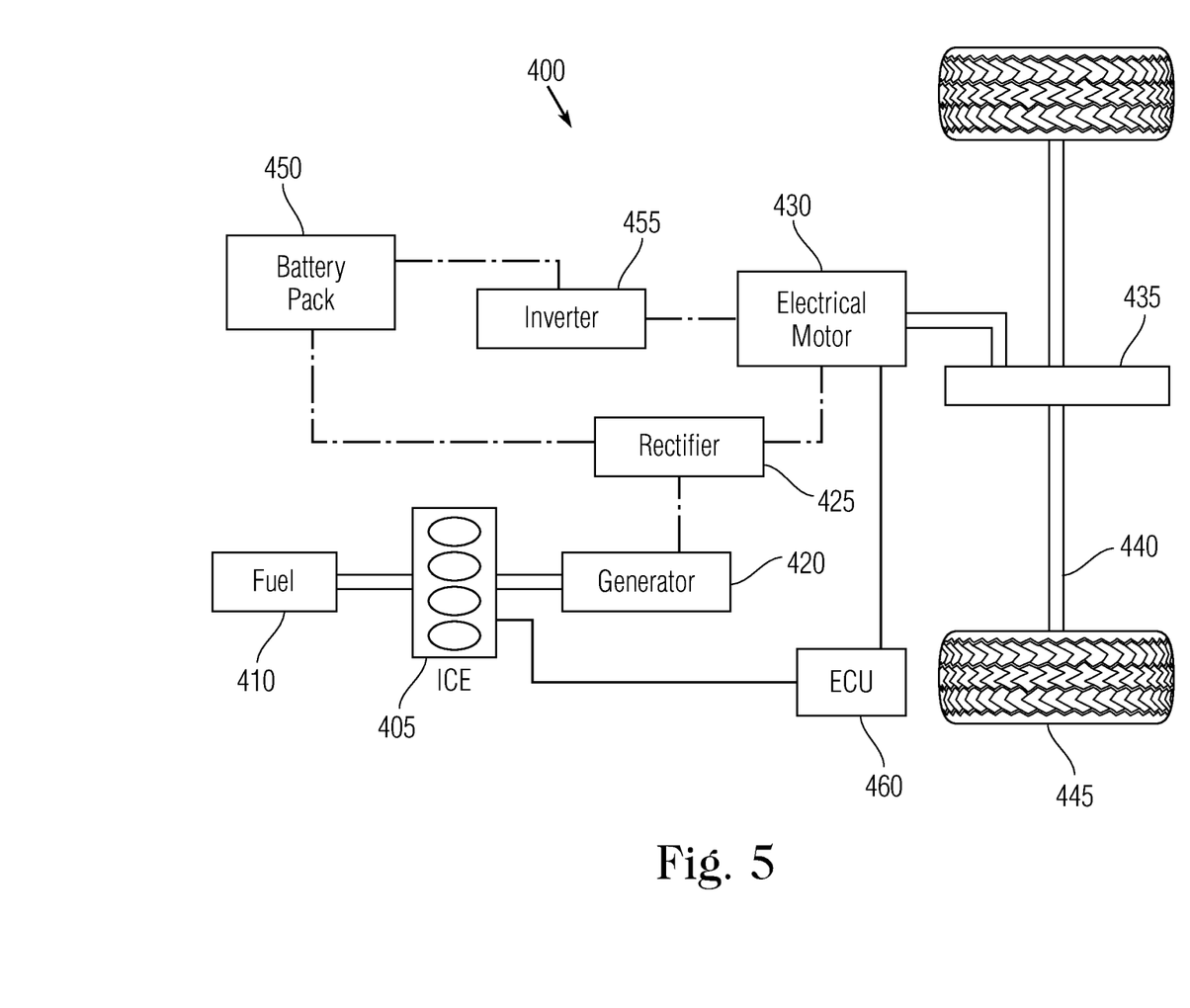
FIG. 5 is a schematic diagram of a series HEV configuration employing a GCI engine according an embodiment of the present invention.

FIG. 5 is a schematic diagram of a series hybrid electric vehicle 400 employing a GCI engine according to an embodiment present invention is shown. The vehicle 400 comprises a GCI engine 405 that is coupled to a fuel supply 410 for receiving fuel. The GCI engine 400 provides power to electric generator 420. Power from the electric generator 420 is fed through a rectifier 425 and then supplied to electric motor 430. The electric motor 430 drives a mechanical transmission 435 which is coupled to the wheel axle 440 and a set of wheels attached thereto 445. The electric motor is also coupled to battery storage 450 via an inverter 455. In addition, the rectifier 425 is also coupled to the battery storage 450 and can charge or recharge the battery storage using power provided by the electric generator 420. receive power from the generator is also coupled to the An ECU 460 is operatively coupled to the GCI engine 405 and the electric motor 460. The ECU 460 also receives signals from one or more sensor elements (not shown) that provide information as to current conditions including, for example, engine load, engine speed, fuel mixture, pressure and temperature.

In the series configuration shown in FIG. 5, the GCI engine is used at particular operating points and to extend the range of the vehicle. As shown in the example graph of FIG. 6D, the operating points are typically specific states in the premixed zone. In comparison to spark ignition (SI) engines, the series configuration employing a GCI engine is more efficient with any level of octane gasoline-like fuel. Additionally, the series hybrid configuration has some advantages in terms of fuel consumption and emissions, and in the flexibility of engine operating conditions and simplified control strategy. For example, the series hybrid configuration can be particular suitable with GCI operation because by combining a clean fuel like gasoline with a high-efficiency thermodynamic cycle such as compression ignition it is possible to create a powertrain that is clean and highly efficient. In addition, the series hybrid configuration eliminates some mechanical linkages to avoid transmission losses. However, the series hybrid configuration also suffers from the drawback of the high frequency with which energy is converted between mechanical and electrical forms (and vice versa), with attendant wear on components and frictional losses.

In some implementations, the hybrid vehicle 400 can be operated with following modes: a) an electric only mode in which the motor 430 is run from the battery storage 450, when it is determined that the power being demanded is no greater than the available power provided by the battery storage; b) an ICE generation plus electric motor mode which is used when the power demanded is between available battery power and generator power. Power is provided by the generator operated by the GCI engine and excess power is used by the electric motor, in electrical generation mode, to charge the battery storage 450; c) an ICE+electric motor mode which is used when the power demanded is greater than the power supplied by the generator 420. In this case the electric motor is powered by both the battery storage 450 and generator 420, with any excess power used to charge the battery storage; d) ICE plus generator only mode which is used when the battery charge is below a minimum threshold. In this case the battery storage 450 does not supply power even if there is power demanded. Once the battery storage 450 attains battery the minimum charge, the electric generator 420 continues to supply power until the battery storage reaches maximum charge; e) a regenerative braking mode that can be used completely for moderate braking and mechanical braking.

The embodiments described above provide high-efficiency equal to that of standard diesel hybrids, with improved $CO_2$, $NO_x$ and particulate emissions in comparison to either diesel and spark ignition hybrids.

It is noted that each of FIGS. 2-5, a single set of wheels (including two wheels attached to an axle) is shown. This is merely for ease of illustration. The GCI hybrid electric configurations can be used to drive additional sets of wheels (e.g., all wheel drive) and/or sets of wheels in different positions (e.g., rear while drive or front wheel drive) without departing from the scope of the invention.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hybrid electric vehicle comprising:
   a set of wheels;
   a mechanical transmission adapted to provide torque to the set of wheels;
   an electric motor coupled to and providing motive force to the mechanical transmission;
   battery storage coupled to and supplying electrical power to the electric motor;
   a gasoline compression ignition (GCI) engine coupled to at least one of the mechanical transmission and the electric motor to provide mechanical energy to the mechanical transmission and energy for operating the electric motor;
   a fuel supply coupling coupled to the GCI engine for providing octane gasoline fuel having an octane number of between 60 to 85; and
   an electric generator mechanically coupled to and powered by the GCI engine,
   a set of pistons each receiving fuel at injection event times and having a compression stroke and an air intake stroke, wherein the compression and intake strokes alternate and have respective cycles; and
   an electronic control unit coupled to and adapted to control operation of the GCI engine and the electric motor, the electronic control unit having instructions for operating the GCI engine, and being configured by the instructions to:
   set gasoline injection event times and quantities within a given compression stroke of one of the pistons so as to occur late in the compression stroke and to be at a fuel pressure of between 100 and 500 bar,
      wherein the injection times and quantities define distinct injection events and provide a stratified fuel/air charge in which a fuel/air mixture comprises local regions of higher and lower ratios of fuel to air, and
      wherein the injection event times and quantities are controlled over a range of speeds and loads to thereby optimize efficiency and emissions, and
   recirculate cooled exhaust gas recirculation (EGR) to dilute the stratified fuel/air charge, increase an ignition delay period and lower a combustion temperature,
   wherein the GCI engine and the electric motor are both coupled to both the mechanical transmission to provide motive power for the vehicle either simultaneously together or individually and the electronic control unit is adapted to control the GCI engine to provide motive power for the vehicle alone at medium load cruising and transitions from under 115 Newton-meters to over 125 Newton-meters of torque.

2. The hybrid electric vehicle of claim 1, wherein the GCI engine and the electric motor are both coupled to both the mechanical transmission to provide motive power for the vehicle simultaneously and the electronic control unit sets a proportion of power provided by the GCI engine and the electric motor, respectively, based on load demand and current vehicle speed.

3. The hybrid electric vehicle of claim 1, wherein the GCI engine and the electric motor are both coupled to both the mechanical transmission to provide motive power for the vehicle individually.

4. The hybrid electric vehicle of claim 1, wherein the electronic control unit operates the electric motor to start the vehicle and to provide motive power for the vehicle alone at low loads under 65 Newton-meters of torque.

5. The hybrid electric vehicle of claim 1, wherein the electronic control unit operates both the GCI engine and electric motor to provide motive power simultaneously to boost acceleration and under loads over 120 Newton-meters of torque.

* * * * *